United States Patent [19]
Dzus, Sr. et al.

[11] 3,827,110

[45] Aug. 6, 1974

[54] RIGID FASTENER

[75] Inventors: Theodore Dzus, Sr., West Islip; Julius Frank Dzus, Islip, both of N.Y.

[73] Assignee: Dzus Fastener Co., Inc., West Islip, N.Y.

[22] Filed: Sept. 18, 1972

[21] Appl. No.: 289,984

[52] U.S. Cl. ............................... 24/221 A, 85/5 B
[51] Int. Cl. ............................................. A44b 17/00
[58] Field of Search ......... 85/5 B; 24/221 R, 221 A, 24/221 L, 211 R, 211 L, 211 M

[56] References Cited
UNITED STATES PATENTS

| | | | |
|---|---|---|---|
| 2,527,408 | 10/1950 | Dzus | 24/221 A |
| 2,815,971 | 12/1957 | Guinane | 85/5 B |
| 3,138,393 | 6/1964 | Livingston | 24/211 L |
| 3,535,752 | 10/1970 | Dzus | 24/221 A |
| 3,656,466 | 4/1972 | Davis, Jr. | 24/221 A |

*Primary Examiner*—Edward C. Allen
*Attorney, Agent, or Firm*—Kane, Dalsimer, Kane, Sullivan and Kurucz

[57] ABSTRACT

A fastener adapted to rigidly fasten two plates having aligned openings. The fastener includes a stud, a sleeve surrounding a portion of the stud and a hollow cap surrounding a portion of the sleeve. A resilient member is on the sleeve and the cap. Locking surfaces are provided including cooperating surfaces on the body of the stud, the sleeve and the cap and at least one bearing member which is shiftable between the locked and unlocked position. One of the stud and the sleeve has a spiral cam slot and the other of the stud and the sleeve has a diametrically extending pin mounted thereon so that when the sleeve is mounted to one of the plates and the stud is extended through the openings in the plates the cam slot will engage with the pin. Rotation of the stud in one direction with respect to the sleeve causes the pin to follow the cam slot, the resilient member to compress and the locking means to be activated to rigidly fasten the plates together. When the stud is rotated in a second direction, the pin will follow the cam slot, the bias on the resilient member will be relieved and the locking means will be deactivated until the cam slot is disengaged from the pin which permits disassembly of the fastener and the plates.

6 Claims, 5 Drawing Figures

PATENTED AUG 6 1974 3,827,110
SHEET 1 OF 2
FIG. 1
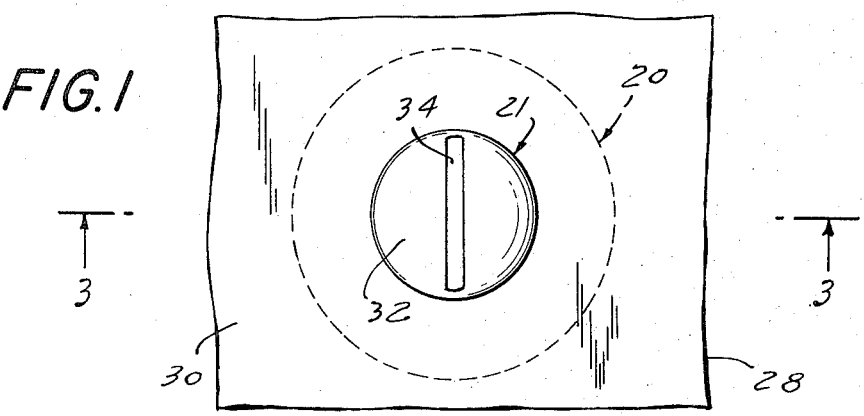
FIG. 2
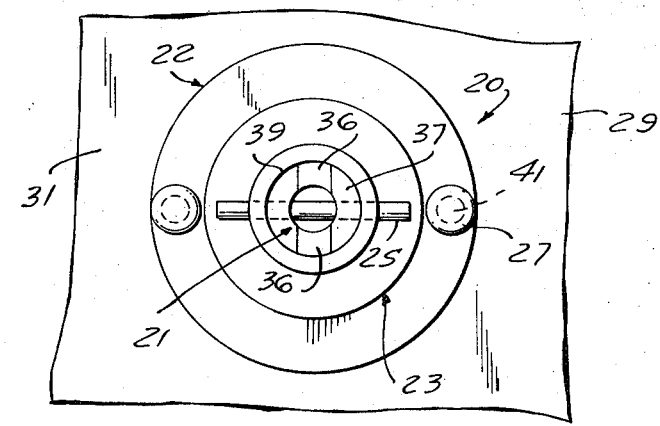
FIG. 3
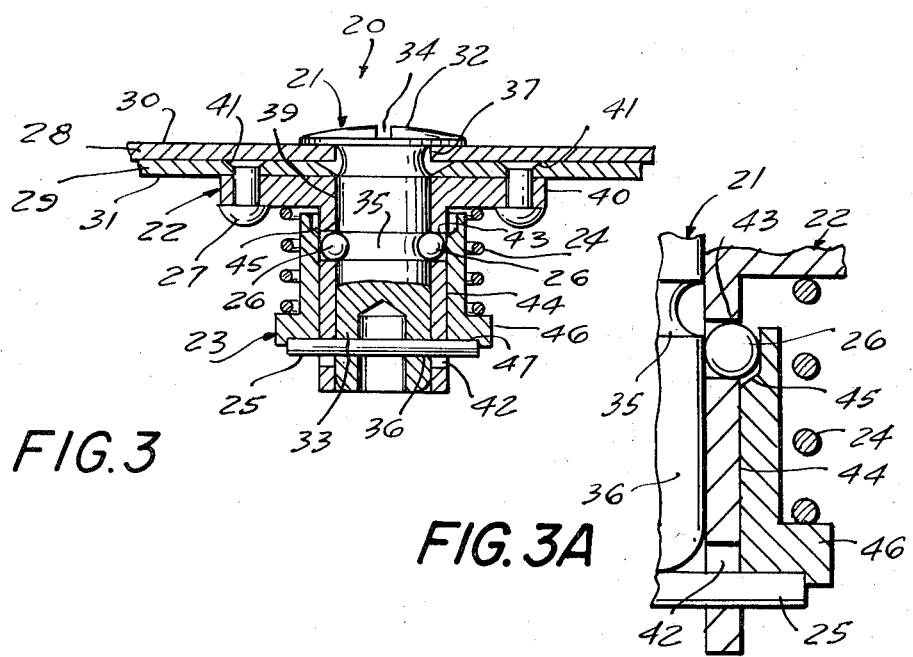
FIG. 3A

RIGID FASTENER

BACKGROUND OF THE INVENTION

It is often desirable to quickly and efficiently fasten two plates or members in rigid engagement with one another. During most fastening operations, this procedure is time consuming and cumbersome and often requires rather complicated fastening devices. A device which can be quickly and easily opened and closed and which is economical to manufacture and assemble would be extremely advantageous. The device must be such that it can be easily mounted to the plates to be fastened and easily and quickly shifted between a disengagement position and a locked position at which time the plates are in rigid engagement with one another.

SUMMARY OF THE INVENTION

With the above thoughts in mind, it is among the primary objectives of the present invention to provide a fastener which is of relatively low cost construction, is readily mountable to a pair of plates to be rigidly engaged, can be quickly and efficiently shifted between an unlocked and a locked position with the plates being in rigid engagement with one another when the fastener is in the locked position.

Thus, a fastener is provided which is adapted to rigidly fasten two plates having aligned openings therein and having an upper and lower surface. A stud is provided having a head and a body portion extending therefrom which is adapted to be extended through the aligned openings in the plates with the head in engagement with the upper surface. A hollow sleeve substantially surrounds the body portion of the stud which extends from the lower surface of the plates. An annular flange laterally extends from the sleeve and is adapted to be mounted to the lower surface of the plates in contact therewith. A hollow cap surrounds a portion of the outer surface of the sleeve and is movably mounted thereon. Resilient means are on the sleeve and cap to permit movement therebetween when force is applied thereto and to tend to return to the normal position thereafter. Locking means are provided including cooperating surfaces on the body of the stud, the sleeve and the cap and at least one bearing member shiftable between the locked and unlocked position. One of the stud and the sleeve has a spiral cam slot and the other of the stud and the sleeve has a diametrically extending pin mounted thereon so that when the stud is extended through the openings in the plates the cam slot will be in position to engage with the pin. Thereafter, when the stud is rotated in one direction with respect to the sleeve the pin will follow the cam slot causing the resilient means to be braced and activating the locking means to rigidly fasten the plates together. Furthermore, when the stud is rotated in a second direction the pin will follow the cam slot to relieve the bias on the resilient means and deactivate the locking means until the cam slot is disengaged from the pin to permit disassembly of the fastener and the plates.

With the above discussed objectives in mind, reference is had to the attached drawings.

BRIEF DESCRIPTION OF THE DRAWINGS

In the drawings:

FIG. 1 is a top plan view of the fastener shown in position locking a fragmentary portion of two plates together;

FIG. 2 is a bottom plan view thereof;

FIG. 3 is a sectional elevation view thereof taken along the plane of line 3—3 of FIG. 1;

FIG. 3a is a fragmentary sectional elevation view thereof showing the fastener in the unloaded position.

DESCRIPTION OF THE PREFERRED EMBODIMENT

Figure 4:
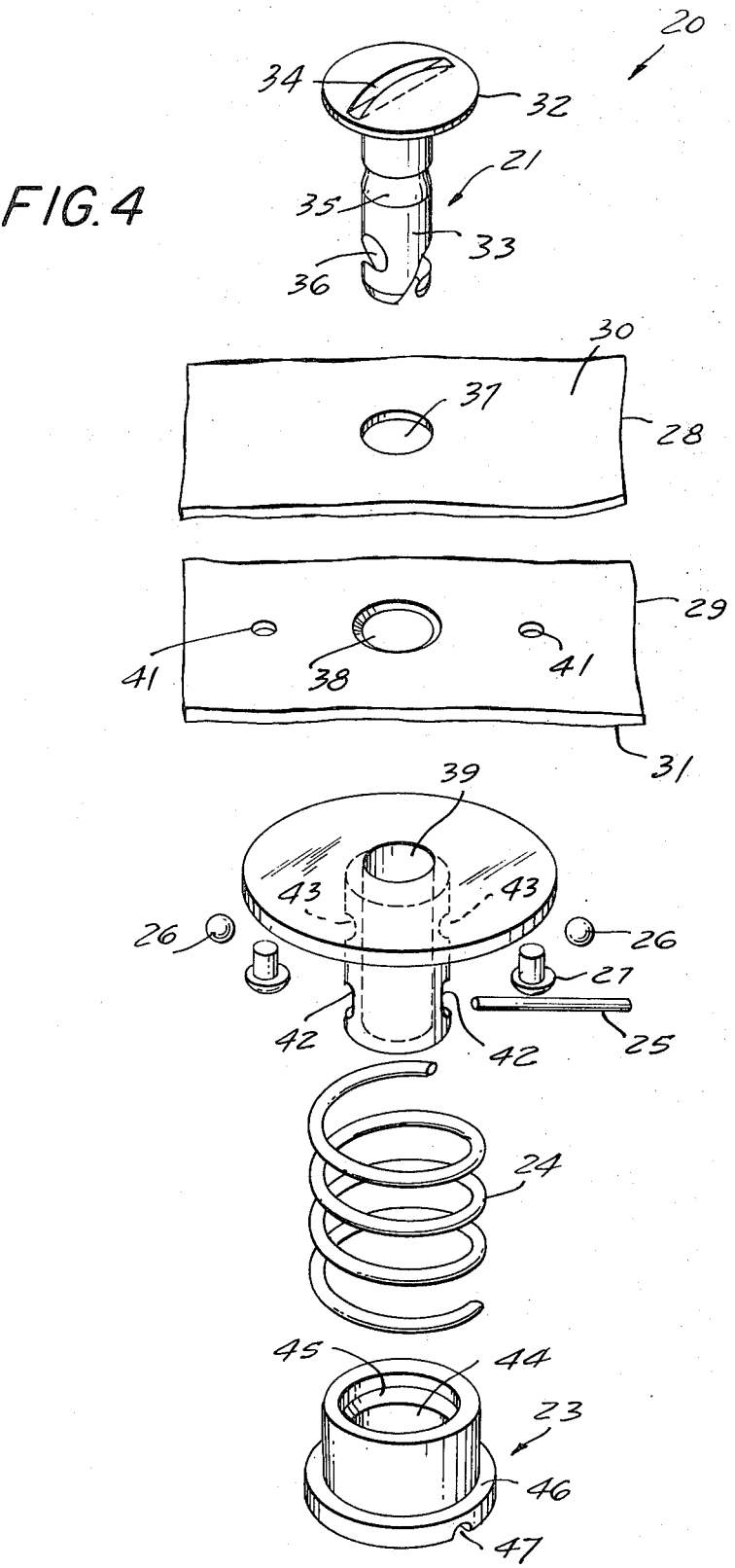
FIG. 4 is an exploded perspective view thereof.

The components of fastener 20 which is of a substantially rigid material with the notable exception of a spring member are shown in exploded form in FIG. 4 of the drawings. The fastener 20 includes a stud 21, a sleeve 22, a cap 23, a coiled helical spring 24, a pin 25 and a pair of balls 26. Also depicted in FIG. 4 are two rivets 27 for fastening sleeve 22 to one of two plates to be rigidly engaged. Plates 28 and 29 are shown as representative of the type of structures to which fastener 20 may be applied. The top plate 28 in the assembly forms an upper surface 30 and the bottom plate 29 forms a lower surface 31. Surfaces 30 and 31 are the surfaces to which force from portions of fastener 20 is applied to hold plates 28 and 29 in rigid interengagement.

Stud 21 includes an enlarged head portion 32 and a body portion of lesser outer diameter 33 extending from the head portion. The undersurface of the enlarged head portion 32 forms a bearing surface for engagement with upper surface 30 of the plates. The upper surface of head 32 includes a slot 34 for reception of a tool to assist in rotation of the stud during locking and unlocking operations.

The body portion of the stud includes a circumferential detent 35 intermediate its ends and a spiral cam slot 36 at its lower end open to the bottom of the stud. Spiral cam slot 36 is of a predetermined length which will permit a follower to travel its entire distance with only a quarter of a turn of the stud.

Top plate 28 has an opening 37 which may be aligned with a corresponding opening 38 in bottom plate 29 for reception of the body portion 33 of stud 21.

Sleeve 22 has a passageway therethrough and is substantially cylindrical in configuration with the diameter of the passageway 39 in sleeve 22 being greater than the outer diameter of body 33. In this manner, sleeve 22 is adapted to receive and surround the substantial portion of body 33 of stud 21. On the upper end of sleeve 22 is a laterally extending flange 40 which forms a bearing surface for engagement with the undersurface 31 of bottom plate 29. Flange 40 and consequently sleeve 22 may be fastened to plate 29 in any conventional manner such as by riveting as shown. Rivet openings 41 are provided in bottom plate 29 to receive rivets 27 which are passed through flange 40 thereby mounting sleeve 22 to bottom plate 29.

Sleeve 22 has a pair of diametrically opposed slots 42 adjacent its lower end for reception of pin 25 therethrough. The vertical height of slots 42 is greater than the diameter of pin 25 so that pin 25 may be vertically shiftable a predetermined amount. Additionally, pin 25 is of greater length than the diameter of sleeve 22 at the location of slots 42 so that the tips of pin 25 extend laterally outward from sleeve 22 when positioned therein.

A pair of diametrically opposed holes 43 are in the outer surface of sleeve 22 adjacent the flange portion thereof and are slightly larger than the diameter of balls 26. Therefore, balls 26 can be received within openings 43 and can be moved inwardly and outwardly with respect to the outer surface of sleeve 22. It should be noted that although in the embodiment depicted two balls and one pin are employed, it is possible to employ a greater number of balls and pins depending upon the particular use. Naturally, corresponding slots and openings would be provided for each additional ball and pin.

Cap 23 is substantially cylindrical in configuration and has a passageway 44 therethrough which is of a greater diameter than the outer surface of sleeve 22 below flange 40. In this manner, sleeve 22 may be received within opening 44 of cap 23. Adjacent the top rim of cap 23 on the interior surface thereof is a beveled shoulder 45 around the entire circumference. This shoulder is positioned so that it will engage with balls 26 during operation of the fastener as will be discussed in detail below. An annular exterior shoulder 46 is at the rear or lower end of cap 23 and is positioned for engagement with the lower end of spring 24. On the undersurface of cap 23 are a pair of opposed notches 47 to receive the exposed tips of pin 25 when the pin is positioned within sleeve 22.

When the fastener is assembled, the lower end of spring 24 bears against shoulder 46 of cap 23 and the upper end of spring 24 engages with the undersurface of flange 40 of sleeve 22. The inner diameter of spring 24 is large enough to permit its insertion onto sleeve 22 as well as the insertion of cap 23 therein with the exception of flange 40 and shoulder 46 which are of a greater diameter than spring 24. In this manner, spring 24 is captured between cap 23 and sleeve 22 and subjected to different forces of compression during operation of the fastener.

In operation, sleeve 22 is riveted to bottom plate 29 by passing rivets 27 through openings in flange 40 and through openings 41 in plate 29. In this position, opening 39 in sleeve 22 is aligned with opening 39. Plate 28 is then positioned into engagement with plate 29 so that opening 37 is aligned with openings 38 and 39. Stud 21 is then passed through openings 37, 38 and 39 until the undersurface of head 22 engages with the upper surface 30 of plate 28.

Balls 26 are positioned in openings 43, spring 24 is positioned around sleeve 22 and cap 23 is slid onto sleeve 22 until it captivates balls 26 in openings 23 and spring 24 between shoulder 46 and the undersurface of flange 40. Pin 25 is then inserted through openings 42 until its tips seat in notches 47 on cap 23. To permit the insertion of pin 25, cap 23 must be moved upwardly on sleeve 22 placing a predetermined bias on spring 24.

In this position, the central portion of pin 25 is located at the bottom opening of cam slot 36 in stud 21. Rotation of stud 33 by insertion of a tool in slot 34 or any other conventional means for rotating the stud will cause pin 25 to follow cam slot 36 to its upper extremity which will be accomplished in approximately one-quarter of a revolution of stud 21. To accommodate the upward travel of pin 25 in following cam slot 36 the pin will move upwardly in slots 42. Since the tips of pin 25 are seated in notches 47 simultaneous with the upward movement of pin 25 in notches 42 will be the movement of cap 23 upwardly placing a greater bias on spring 24 and causing beveled shoulder 45 to force balls 26 inwardly into locking position in detent 35 of stud 21. The wedging action of forcing balls 26 into tight interengagement with receiving detent 35 prohibits the vertical movement of stud 21 with respect to sleeve 22 and thereby prohibits the vertical movement of plates 28 and 29 which are held in rigid position between the undersurface of head 32 and the upper surface of flange 40.

To unlock the fastener, it is only required to rotate stud 32 one-quarter of a revolution in the opposite direction so that pin 25 will follow cam slot 36 downwardly out of engagement with stud 21. Simultaneously, spring 24 will cause cap 23 to follow pin 25 downwardly as the extra bias on the spring is relieved. As cap 23 moves downwardly, beveled shoulder 45 is removed from wedging engagement with balls 26 permitting balls 26 to move outwardly and become free from locking engagement with detent 35 of stud 21. Stud 21 is then free to be removed from plates 28 and 29 permitting the plates to be disassembled.

In summary, the stud has a spiral cam slot that engages a pin which projects through linear slots in a fixed sleeve and rests on a moveable sleeve located on the exterior of the fixed sleeve. The moveable sleeve has a spring mounted to maintain it in an unlocked position and yet allows linear motion when the stud engages the pin and is rotated so that the stud spiral cam lifts the sleeve by means of the pin. When the stud is fully engaged, two more balls located in the fixed sleeve are actuated by the moveable sleeve so as to engage a radial groove in the stud and rigidly couple the stud to the sleeve.

Rotation of the stud in the opposite direction reverses the action; the moveable sleeve drops down due to spring action allowing the balls to disengage the groove in the stud, thereby disengaging the stud and allowing panel separation.

Thus, the above discussed objectives of the invention, among others, are effectively attained.

We claim:

1. A fastener adapted to rigidly fasten two plates having aligned openings therein and forming upper and lower surfaces comprising:

a stud having a head and a body portion extending therefrom adapted to be extended through the aligned openings in the plates with the head in engagement with the upper surface of the plates;

a hollow sleeve substantially surrounding the body portion of the stud which extends from the lower surface of the plates;

an annular flange laterally extending from the sleeve and adapted to be mounted to the lower surface of the plates in contact therewith;

a hollow cap surrounding a portion of the outer surface of the sleeve and movably mounted thereon;

resilient means on said sleeve and cap to permit movement therebetween when force is applied thereto and to tend to return to the normal position thereafter;

said resilient means including a helical compression spring surrounding the cap and the sleeve and being captured between the laterally extending annular flange on the sleeve and a parallel laterally extending flange on the cap so as to be responsive to axial movement between the cap and the sleeve;

locking means including cooperating surfaces on the body of the stud, the sleeve and the cap and at least one bearing member shiftable between the locked and unlocked position;

one of said stud and said sleeve having a spiral cam slot and the other of said stud and said sleeve having a diametrically extending pin mounted thereon so that when said stud is extending through the openings in the plates, said cam slot will be in position to engage with said pin, and when said stud is rotated in one direction with respect to said sleeve, said pin will follow said cam slot causing the resilient means to be biased and the locking means to be activated to rigidly fasten the plates together, and when the stud is rotated in a second direction the pin will follow the cam slot causing the bias on the resilient means to be relieved and the locking means to be deactivated until the cam slot is disengaged from the pin to permit disassembly of the fastener and the plates;

the cam slot being on the body portion of the stud and the pin extending through two diametrically opposed slots in the sleeve;

the lower exposed lateral surface of the cap containing a pair of diametrically opposed notches in alignment with the slots in the sleeve to receive the respective end portions of the pin extending from the diametrically opposed slots in the sleeve;

the slots in the sleeve are being greater in length than the diameter of the pin to permit a predetermined amount of vertical shifting of the pin with respect to the sleeve; and said cap being axially shiftable with respect to the sleeve between the locked and unlocked positions with the pin providing the engaging force to shift the cap from the unlocked to the locked position and the opposing engaging force to shift the cap from the locked to the unlocked position being provided by the helical compression spring independent of the pin.

2. The invention in accordance with claim 1 wherein the head of the stud contains a centrally located slot adapted to receive a tool to facilitate the rotation of the stud with respect to the remainder of the fastener.

3. The invention in accordance with claim 1 wherein the flange is riveted to the plate containing the surface forming the lower surface of the two-plate assembly.

4. The invention in accordance with claim 1 wherein the locking means includes an annular beveled shoulder on the interior surface of the cap, a circumferential detent on the stud, at least one hole in the sleeve, a ball in the hole in the sleeve and adapted to be shifted inwardly and outwardly with respect to the sleeve, and the shoulder, the detent and the hole being in alignment when the fastener is assembled so that when the stud is rotated to the locked position, the ball will be shifted into the detent in the stud to thereby lock the fastener and hold the plate in rigid fastened position and when the stud is shifted to the unlocked position, the ball can be shifted out of engagement with the detent while still being held in the hole by the beveled shoulder to thereby permit disassembly of the fastener and the plates.

5. The invention in accordance with claim 4 wherein there are two diametrically opposed holes in the sleeve and a ball is located in each hole.

6. The invention in accordance with claim 1 wherein the cam slot is of a predetermined length so that a one quarter revolution of the stud is required to shift the fastener between the locked and unlocked position.

* * * * *